Figure 1:
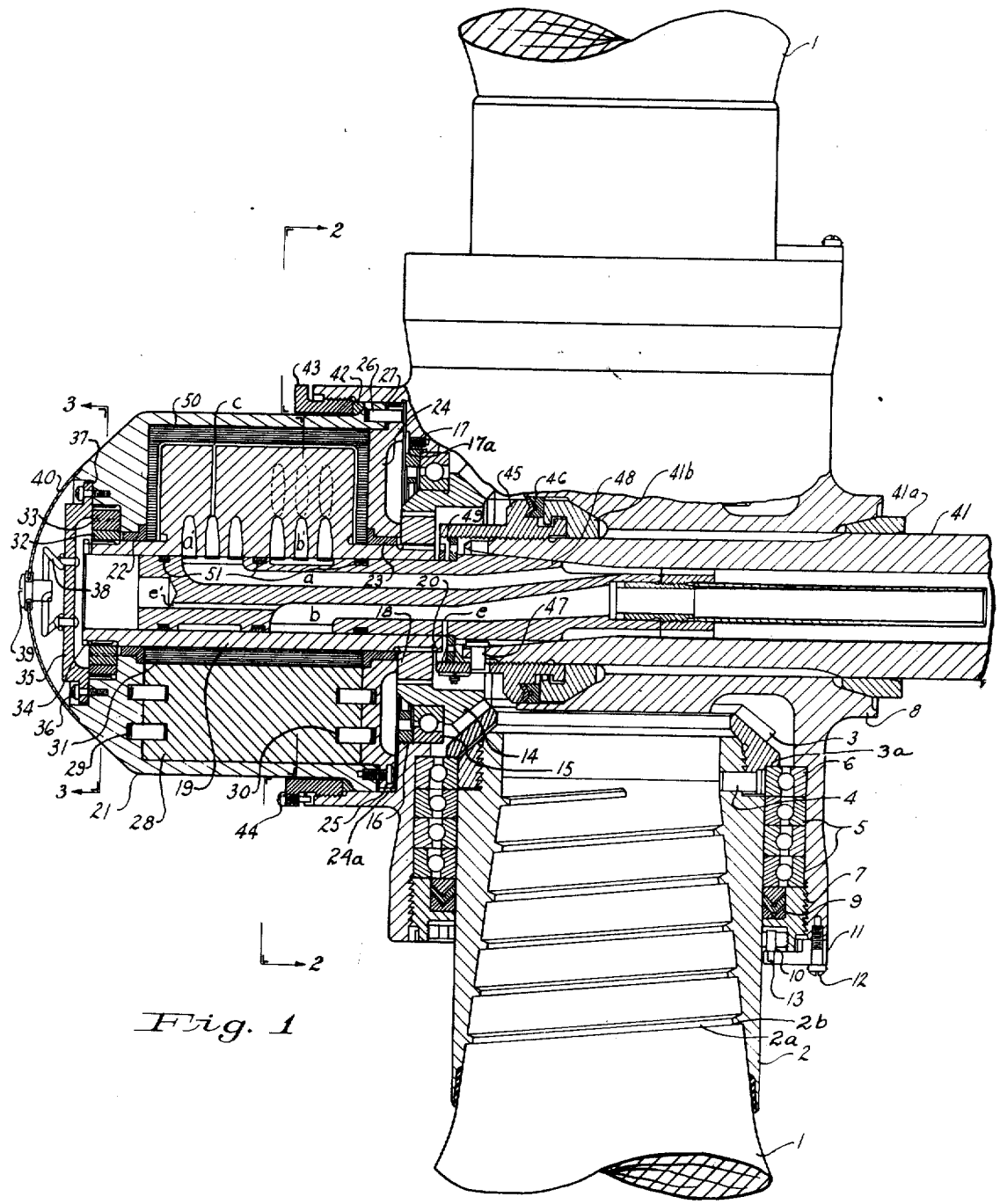

June 26, 1945.  W. S. HOOVER  2,379,302

VARIABLE PITCH PROPELLER

Filed May 6, 1941  3 Sheets-Sheet 1

INVENTOR.
Walter S. Hoover
BY William B. Jaspert
Attorney.

June 26, 1945.   W. S. HOOVER   2,379,302
VARIABLE PITCH PROPELLER
Filed May 6, 1941   3 Sheets-Sheet 2

INVENTOR.
Walter S. Hoover
BY William B. Jaspert
Attorney

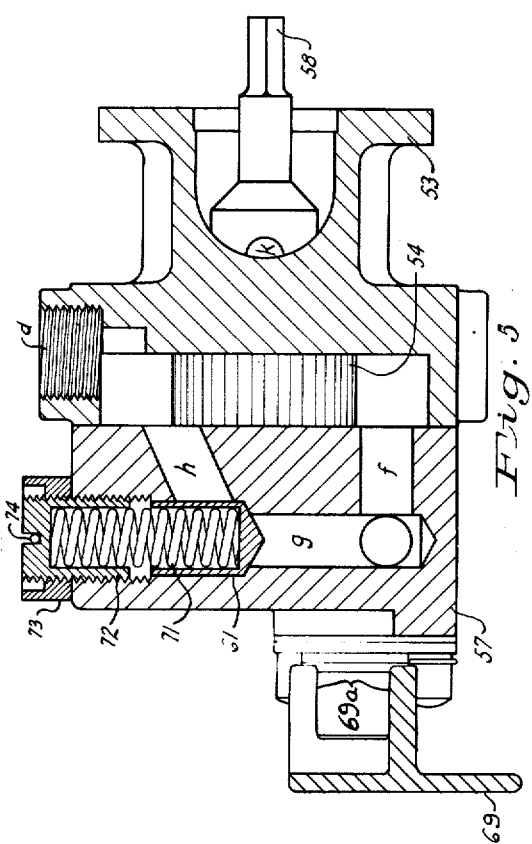
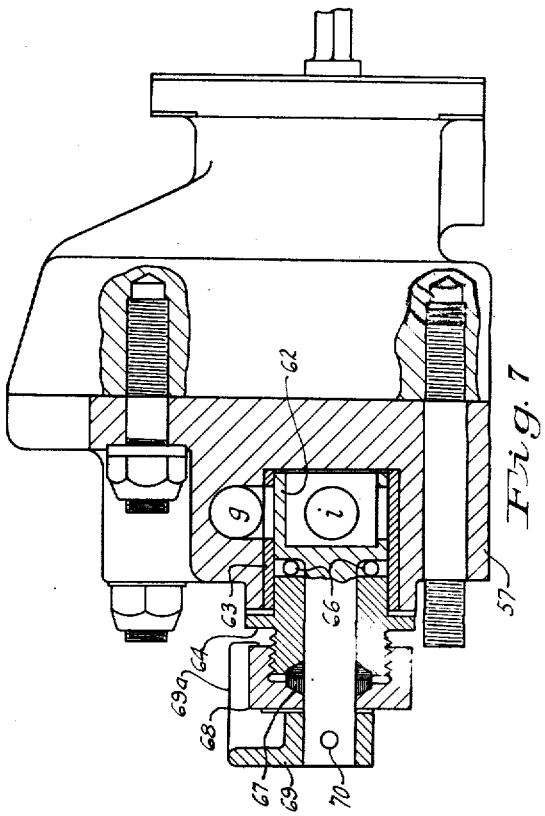
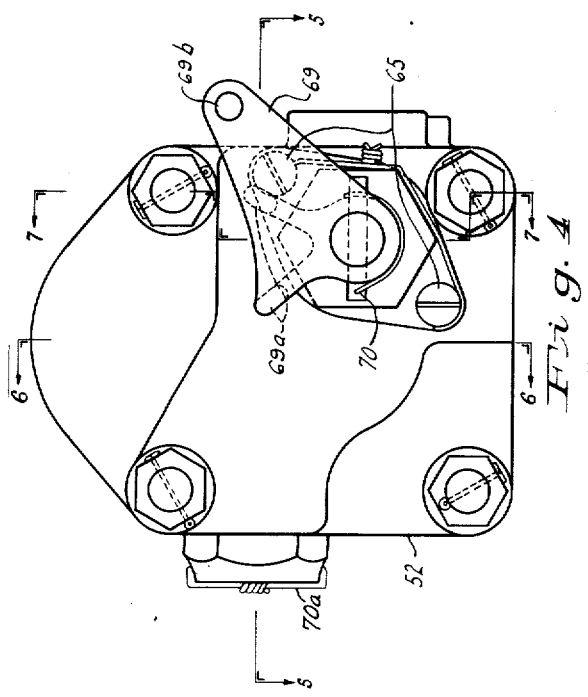
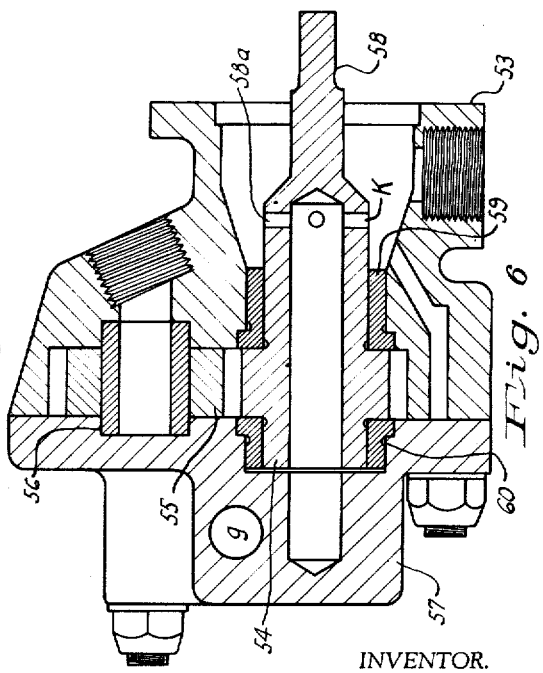

Patented June 26, 1945

2,379,302

UNITED STATES PATENT OFFICE 2,379,302

VARIABLE PITCH PROPELLER

Walter S. Hoover, Montreal, Quebec, Canada

Application May 6, 1941, Serial No. 392,079

5 Claims. (Cl. 170—163)

This invention relates to new and useful improvements in variable pitch propellers and propeller hub structures, and it is among the objects thereof to provide a variable pitch propeller mechanism that is hydraulically actuated and which is of the two-position type, having a fixed limit stop in one position of the pitch adjusting range, and actuating means for adjusting the pitch setting to any desired position from the fixed position through an adjustable angle of approximately 20°.

The invention is especially applicable for use in moderate sized engines such as 300 horsepower and is designed to be hand-controlled, although it is adapted to governor speed control if desired.

Another object of the invention is the provision of an integral hub design adapted for use interchangeably with both all-metal and wooden blade propellers.

Another object of the invention is the provision of a hydraulic actuator for the pitch setting mechanism which utilizes high pressure oil supplied by a booster pump for advance pitch setting, while employing the lower pressure of the engine lubricating oil plus the blades' centrifugal twisting moments for the low pitch setting.

Figure 2:
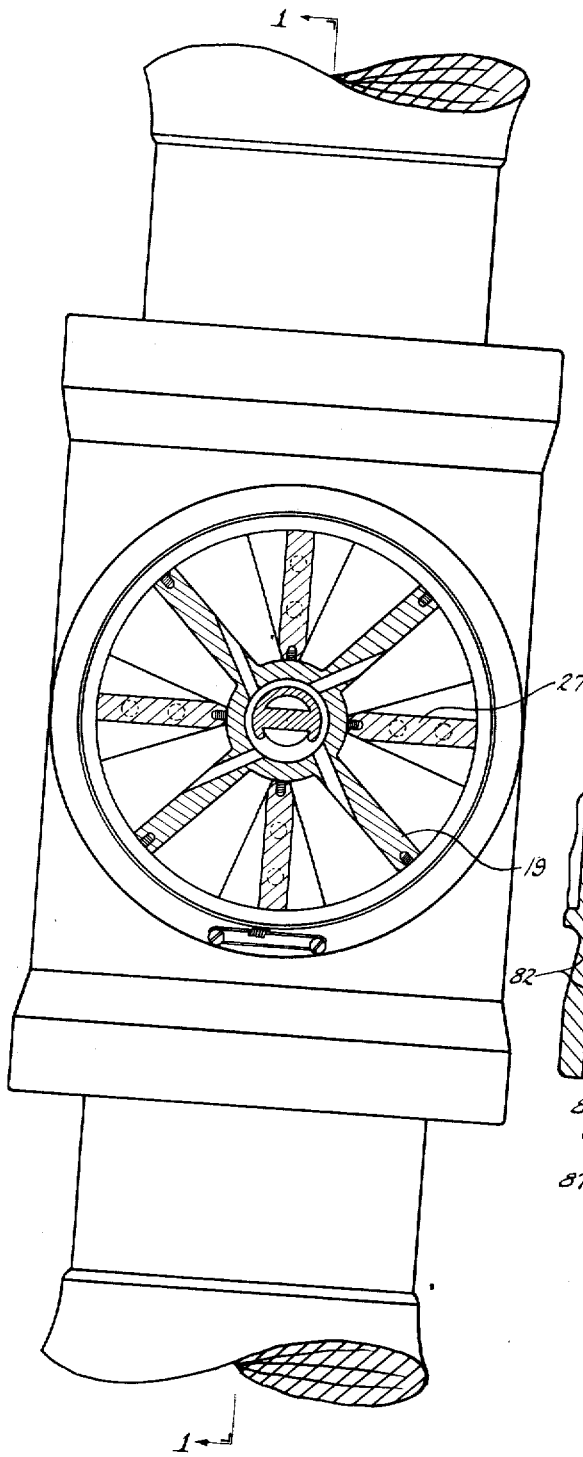
Figure 3:
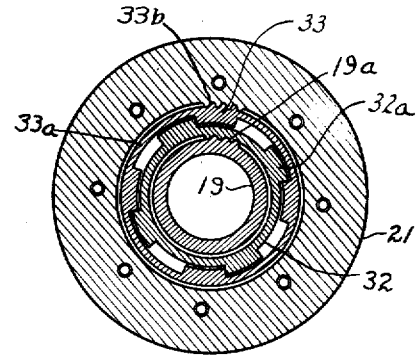
Figure 8:
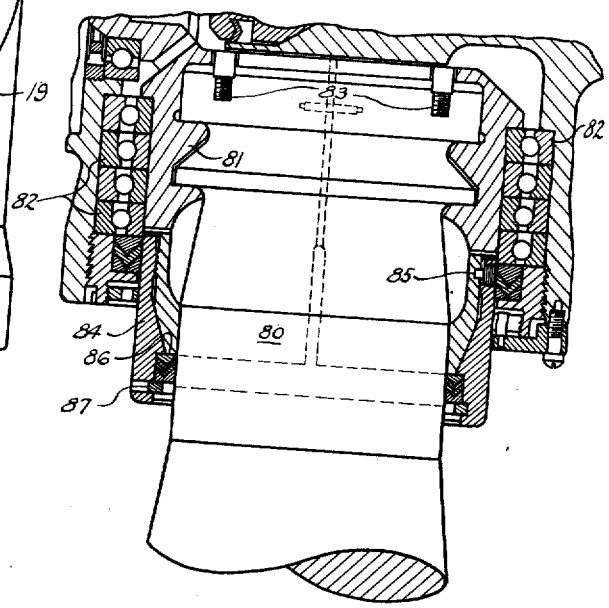

The invention will become more apparent from a consideration of the accompanying drawings constituting a part hereof in which like reference characters designate like parts and in which:

Fig. 1 is a cross-sectional view through a propeller hub partially in elevation taken along the line 1—1, Fig. 2;

Fig. 2 a front elevational view partially in cross-section taken along the line 2—2, Fig. 1;

Fig. 3 a cross-sectional view through the hydraulic actuator housing taken along the line 3—3, Fig. 1;

Fig. 4 a top plan view of a booster pump and control valve;

Fig. 5 a cross-section taken along the line 5—5, Fig. 4;

Fig. 6 a cross-section taken along the line 6—6, Fig. 4;

Fig. 7 a cross-sectional view partially in elevation taken along the line 7—7, Fig. 4; and Fig. 8 a cross-section of a portion of the hub structure with the propeller blade root in elevation.

With reference to Fig. 1 of the drawings, the structure therein illustrated comprises blades 1 of plastic and wood threaded on steel sleeves 2 by grooves 2a and threads 2b to provide bearing surfaces. Threaded onto the inboard end of these sleeves 2 are bevel gears 3 which are locked thereto with pins 4. A shoulder 3a on each gear 3 carries the blade's centrifugal loads to a matched set of stacked bearings consisting of three thrust bearings 5 and a reversed preloaded bearing 6. Blade retaining nuts 7 transfer these loads to the hub barrels 8 and support chevron-type oil seals 9 and assembly balancing rings 10. A lock 11 is splined to the blade retaining nut 7 and attached to the hub barrel end by two small screws 12. A small pin 13 is fixed to this lock 11 to lock the balancing ring 10. The blade retention nut 7 thus preloads the antifriction bearings 5 and 6 to evenly divide the load between them.

Meshing with the bevel gear 3 on the blade shank is a bevel gear 14 located and fixed in the hub concentric to the crankshaft by means of a ball bearing 15 and a threaded ring 16 which screws into the hub barrel 8 and serves to preload the bevel gears 3 and 14 which take the centrifugal loading of the blades. A section of the head of a screw 17, which threads into the hub barrel 8, is engaged with an arc 17a on the periphery of this pre-load ring 16 to serve as a lock. Externally splined to the forward end of the bevel gear hub 14 is a ring 18 which is internally splined to the shaft of a rotor 19. This adjusting ring 18, which also serves to facilitate assembly, is held on the end of the shaft of rotor 19 by a split snap ring 20.

The rotor 19 is housed in a cylindrical dome 21 and is positioned and held therein by brass oil seal bushings 22 and 23 in such manner that it is free to rotate relative to the dome 21. The rear bushing is pressed into a torque plate 24 which is attached to the dome 21 by screws 25 and dowels 26. Torque plate 24 has serrations 24a that coact with serrations on hub barrel 8 whereby together with the external spline connections between ring 18 and bevel gear 14 and the internal spline connection between ring 18 and rotor 19 angular adjustments in increments of .25 degree between rotor 19 and the blades may be made. A gasket 27 is interposed between the torque plate 24 and dome 21 so that an oil-tight chamber in which the rotor 19 is sealed is formed. Also assembled in this chamber are abutments 28 which are fixed in place by two sets of dowels 29 and 30 set into the dome 21 and torque plate 24, respectively. Micarta or other flexible oil seal strips 31 are placed between the abutments 28 and the rotor shaft 19.

Splined as shown at 19a onto the forward end of the rotor 19 is a metal ring 32, Fig. 3, having four lugs 32a which project between four corresponding lugs 33 on an encircling ring 33a that is externally splined at 33b to the dome 21. These rings 32 and 33 form the low angle limiting stops. A split snap ring 34 holds the inner stop ring 32 on the rotor shaft 19. A circular plate 35 is held to the dome 21 by safety screws 36 and serves to retain the outer stop ring 33. Inserted between this plate 35 and the dome 21 is a gasket 37 to seal the fluid in the rotor 19. Riveted to the plate 35 is a Dzus fastener spring 38 which engages with a Dzus fastener pin 39 to secure a spherical cap 40 to the dome 21.

The dome and rotor assembly mounts onto the front section of the hub barrel 8 concentric with the crank shaft 41 and is held thereon by a sector-shaped washer 42 and a nut 43 which encircles the dome 21 and threads into a cylindrical flange integral with the hub 8. Small screws 44 lock this nut to the hub. As hereinbefore stated torque plate 24 is serrated to the hub barrel 8 to prevent the dome assembly from rotating and allow adjustment between rotor and dome, as well as to facilitate assembly.

The propeller is centered on the crankshaft 41 by conventional front and rear cones 41a and 41b, respectively, the latter being secured thereon by a retaining nut 45. A chevron type oil seal 46 is compressed between this nut 45 and the cone 41b to stop seepage of oil into the splines. The nut 45 is locked by a clevis pin 47 which is kept in place by an oil distributor tube 48 inside the crankshaft. This tube 58 is located on the inside taper of the shaft 41 and is held in place by a nut 49 threaded into the cone retaining nut 45 and locked thereto with safety wire.

This tube 48 projects beyond the front of the hub barrel 8 so that the dome and rotor fits over it in such a manner that two annular grooves which connect with two separate oil channel a and b formed in the tube 48 are, respectively, adjacent to forward and rear sets of holes drilled respectively from the opposite sides of the rotor vanes to the rotor bore. Thus oil in the forward channel a is led out to one side of the rotor vanes and oil in the rear channel b to the opposite side. Carried in grooves along the top face in each rotor vane are fibrous oil seals 50 which are pressed against the dome wall by oil pressure in a small hole c running from the grooves to the holes matching with the forward oil channel a. Metallic oil seal rings 51 are placed between the rotor bore and the oil distributor tube 48 to minimize leakage.

Oil under engine pressure is supplied to the rear channel b and reaches the hub for lubricating purposes through a small radial hole e, and the rotor 19 is pressure balanced by the engine pressure oil through gland e'.

Oil under high pressure is supplied to the forward channel a of the distributor tube 48 by the gear type booster pump generally designated by the numeral 52, Figs. 4, 5, 6 and 7. This booster pump 52 is mounted onto a pump pad by means of studs through the base 53. Engine oil is admitted into the inlet pump chamber through a hole d tapped into the base 53.

Immediately adjacent the pump chamber are a pair of pump gears 54 and 55. One of these gears, 54, the driver, is formed integral with a drive shaft 58 which is located by two oil seal bushings 59 and 60 shrunk into the pump base 53 and the pump cap 57, respectively. The driven gear 55 encircles a brass bearing 56 seated in recesses in the base 53 and cap 57.

A manually controlled valve 62 is seated in a bushing 63 shrunk in the cap 57. A sleeve 64 fixed to the cap by two screws 65 serves to guide and hold this valve 62 in place. A ring of ball bearings 66 is interposed between the valve 62 and sleeve 64 to minimize friction. To limit oil leakage, a pair of oil seals 67 are fitted around the valve stem and are held in place on top of the sleeve 64 by a nut 68 threaded onto it. A control lever 69 is attached to the valve stem by a taper pin 70 locked with safety wire 70a. Formed integral with the lever 69 are two lugs 69a which limit the lever movement to 90 degrees by striking against the screws 65 holding the sleeve 64. This lever 69 is provided with a hole 69b for attaching a control rod or cable operated by the pilot.

After passing through the gear pump, the oil is pumped to a channel f leading to either the manual valve 62 or a relief valve 61. When the lever 68 is in one position, high pressure oil is routed into the forward channel a of the distributor tube, Fig. 1, and thence, through the matching holes a' in the rotor vanes, into the chambers formed in the dome by the vanes and abutments 27. The pressure then exerted turns the rotor in the direction that causes the gear train to drive the blades to high pitch. The pressure against the abutments 27 is transmitted to the torque plate 24 partly by way of the dome and forward set of dowels 29 and partly directly by the rear set of dowels 30. This torque is then transmitted to the hub barrel 8 by the splines of the torque plate 24.

When the control lever 69 is placed in the other position, the high pressure oil from the gear pump is blocked by the valve 62 and is diverted in a channel g leading to the relief valve 61. This valve is locked by a helical spring 71 which is adjustable in compression by a long screw 72 threaded into the cap 57. A nut 73 is threaded onto screw 72 and locked thereto by a snap-ring 74. The high pressure oil opens the relief valve 61 and by-passes through a diagonal channel h back to the inlet chamber, from where the cycle is repeated until the valve 62 is changed. With the high pressure fluid thus being by-passed, a port i in the valve 62 connects the forward channel a of the distributor tube 48 to drain through openings K in the drive gear shaft 58, thus permitting engine oil pressure and the centrifugal twisting movements to turn the blades to low pitch.

In Fig. 8 is shown a modification of the propeller blade mounting of Fig. 1 which is adapted for the use of aluminum alloy blade propellers, the blade assembly being interchangeable with the plastic or wood type of blades illustrated in Fig. 1 of the drawings.

In Fig. 8 the aluminum alloy blade shanks 80 are encased in split steel ferrules 81 which are held on to the blades by the matched set of bearings 82. They are prevented from turning on the blades by cap screws 83 threaded under the blade roots. The outer extremities of the ferrules 81 have a short length taper for receiving a one-piece nut 84 having a matching taper. This nut 84 threads to the ferrule and by pulling it up tightly, the ferrule is made to clamp the blade rigidly and thus restrain a movement of the blade relative to the ferrule 81. A small screw 85 serves to lock the nut to the ferrule and in turn is held in place by the inner race of the outermost bearing.

To prevent the loss of hub lubricants, the outer extremity of the ferrule clamp nut 84 is provided with a chevron-type oil seal packing 86, which is held in place by a split snap-ring 87 expanding into a matching groove in the end of the nut 84.

The relief valve 61, Fig. 5, is set somewhat above the engine oil pressure, plus the centrifugal twisting moments. Thus, to increase the pitch setting of the blades, the high pressure oil is routed into the fluid actuator through the oil channel $a$ where it overpowers the opposing forces. To dismiss the pitch setting, the hydraulic actuator is shut off from the control mechanism and the engine oil pressure and centrifugal force moments effect a low pitch setting of the blades; that is to say, the hydraulic actuator assumes the fixed stop position for the blades.

The hydraulic actuator with pilot control for high pitch setting only disclosed herein is especially adapted for small planes, and particularly for training pilots.

It is designed to be rugged in construction and to be immune from abuse through improper use.

Although several embodiments of the invention have been herein illustrated and described, it will be evident to those skilled in the art that various modifications may be made in the details of construction without departing from the principles herein set forth.

I claim:

1. In a variable pitch propeller mechanism, a hollow hub structure mounted for rotation with an engine shaft, propeller blades journalled in said hub having gear wheels coacting with the teeth of an actuator gear to be simultaneously subjected to rotary movement for angular adjustment of the propeller blade, a rotor mounted on an extension of the engine shaft, and means including a disk having internal spline connection with said rotor and external spline connection with the actuator gear to rotate the latter in response to movement of the rotor, and a torque plate connected to a rotor housing, said torque plate having a serrated periphery engaging complementary faces of the propeller hub, whereby together with the spline disk the rotor may be angularly adjusted in increments of a fraction of a degree relative to the angular position of the blades.

2. In a variable pitch propeller mechanism, a hollow hub structure mounted for rotation with an engine shaft, propeller blades journalled in said hub having gear wheels coacting with the teeth of an actuator gear to be simultaneously subjected to rotary movement for angular adjustment of the propeller blade, a rotor mounted on an extension of the engine shaft, and means including a disk having internal spline connection with said rotor and external spline connection with the actuator gear to rotate the latter in response to movement of the rotor, a dome housing for said rotor, a ring mounted on the rotor having angularly spaced lugs and a ring connected to the dome having inwardly projecting lugs for abutting the lugs of said rotor ring, said lugs constituting the low angle limiting stops of the propeller blades.

3. In a variable pitch propeller mechanism, a hub structure having a plurality of blade sockets for mounting propeller blades for rotary movement therein and having an axial flange at the forward end of the hub, a dome-shaped housing mounted in and secured to said axial flange, said housing being sealed from said propeller hub, a rotor mounted in said housing comprising a plurality of vanes coacting with stationary abutments provided in the rotor housing, flow channels communicating with one side of the rotor vanes connected to a fluid pump, flow channels communicating with the opposite sides of said rotor vanes connected to the engine lubricating system, valve means operable in one position to establish communication of the high pressure fluid source with the rotor vanes, and in another position to disconnect the high pressure source of fluid and open the high pressure fluid flow channel to a drain while simultaneously connecting the opposite sides of the rotor vanes to the engine lubricating oil, said rotor having angular abutments constituting low blade pitch angle limiting stops independently of the rotor vanes and stationary abutments.

4. In a variable pitch propeller mechanism, a hub structure having angularly-spaced blade sockets for mounting propeller blades for rotary movement therein, a blade-adjusting rotor geared to the blades for simultaneously actuating the blades in their pitch adjusting movement, said rotor comprising stationary and movable vanes having fluid flow connections with a source of pressure fluid on opposite sides of the vanes, said rotor having angular abutments consisting of a ring internally splined, adjustably mounted on the rotor housing, and a ring externally splined, coacting with said first-named ring and adjustably mounted on the rotor shaft, said splined rings constituting fixed limit stops to determine the low angle limit of the propeller blade setting independently of the relative angular position of the stationary and movable rotor vanes.

5. In a variable pitch propeller mechanism, an integral hub structure having blade sockets extending radially thereon, blades mounted for rotary movement in said sockets, said blades having gear teeth coacting with the teeth of a master gear and said hub having a flange extending axially on the front end thereof, a torque plate mounted in said flange having apertures on the external periphery thereof coacting with complementary shaped apertures in said hub flange, a rotor housing secured to said torque plate, a rotor in said housing for actuating said master gear, a drive ring disposed between said rotor and master gear having serrations on the internal and external periphery thereof coacting with complementary shaped serrations in said rotor and master gear, said rotor being further provided with peripheral abutments for engaging a movable stop consisting of an annulus having radial abutments coacting with stationary abutments on said rotor housing which together with the peripheral serrations of said rotor torque ring and master gear connecting ring being adjustable to obtain infinite adjustment of the rotor and propeller blade angle.

WALTER S. HOOVER.